(12) United States Patent
Bill

(10) Patent No.: US 8,413,182 B2
(45) Date of Patent: Apr. 2, 2013

(54) MECHANISM FOR RENDERING ADVERTISING OBJECTS INTO FEATURED CONTENT

(75) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 200 days.

(21) Appl. No.: 11/462,565

(22) Filed: Aug. 4, 2006

(65) Prior Publication Data

US 2008/0046920 A1    Feb. 21, 2008

(51) Int. Cl.
*H04N 7/10* (2006.01)
*H04N 7/025* (2006.01)

(52) U.S. Cl. .......................................... 725/34; 725/35

(58) Field of Classification Search .................. 725/36
See application file for complete search history.

(56) References Cited

U.S. PATENT DOCUMENTS

| | | | | |
|---|---|---|---|---|
| 5,543,856 | A * | 8/1996 | Rosser et al. | 348/578 |
| 5,808,695 | A * | 9/1998 | Rosser et al. | 348/584 |
| 5,892,554 | A * | 4/1999 | DiCicco et al. | 348/584 |
| 6,184,937 | B1 * | 2/2001 | Williams et al. | 348/515 |
| 6,839,903 | B1 | 1/2005 | Shintani et al. | |
| 7,000,242 | B1 | 2/2006 | Haber | |
| 7,222,163 | B1 | 5/2007 | Girouard et al. | |
| 7,610,597 | B1 | 10/2009 | Johnson et al. | |
| 7,631,330 | B1 | 12/2009 | Des Jardins | |
| 7,827,574 | B1 * | 11/2010 | Hendricks et al. | 725/34 |
| 2002/0059591 | A1 * | 5/2002 | Nakagawa | 725/36 |
| 2002/0144262 | A1 * | 10/2002 | Plotnick et al. | 725/32 |
| 2003/0028873 | A1 * | 2/2003 | Lemmons | 725/36 |
| 2003/0101454 | A1 * | 5/2003 | Ozer et al. | 725/42 |
| 2004/0045040 | A1 | 3/2004 | Hayward | |
| 2006/0010469 | A1 | 1/2006 | Reynolds et al. | |
| 2006/0248569 | A1 * | 11/2006 | Lienhart et al. | 725/135 |
| 2006/0253864 | A1 * | 11/2006 | Easty | 725/35 |
| 2007/0055985 | A1 * | 3/2007 | Schiller et al. | 725/34 |
| 2007/0226761 | A1 * | 9/2007 | Zalewski et al. | 725/32 |
| 2008/0221942 | A1 * | 9/2008 | Agnihotri et al. | 705/7 |

* cited by examiner

*Primary Examiner* — Brian Pendleton
*Assistant Examiner* — Ryan Stronczer
(74) *Attorney, Agent, or Firm* — Finnegan, Henderson, Farabow, Garrett & Dunner, L.L.P.

(57) ABSTRACT

Advertisements may be inserted into a streaming video at an intermediary system by receiving a data stream including a video content selection having scenes configured to accommodate insertion of advertising objects, identifying an advertising descriptor based on characteristics of a scene within the data stream, selecting an advertising object based on the identified advertising descriptor, modifying the video content selection by inserting the advertising object in the data stream such that the advertising object is integrated into a scene of the video content selection, where an image scene of the video content selection is modified to integrate and enable visual display of content from within the scene of the video content selection and the advertising object concurrently, and transmitting the content selection to a recipient.

25 Claims, 8 Drawing Sheets

MECHANISM FOR RENDERING ADVERTISING OBJECTS INTO FEATURED CONTENT

TECHNICAL FIELD

This document relates to advertising and streaming media systems.

BACKGROUND

Inserting advertisements and other advertising content into a media feed may be manually intensive and prone to operator error. One approach to inserting advertising has involved placing advertisements during the idle playback periods, known as commercial breaks.

SUMMARY

In one general sense, advertisements may be inserted into a streaming video at an intermediary system by receiving a data stream including a video content selection having scenes configured to accommodate insertion of advertising objects, identifying an advertising descriptor based on characteristics of a scene within the data stream, and selecting an advertising object based on the identified advertising descriptor. The video content selection may be modified by inserting the advertising object in the data stream such that the advertising object is integrated into a scene of the video content selection, where an image scene of the video content selection is modified to integrate and enable visual display of content from within the scene of the video content selection and the advertising object concurrently. The content selection is transmitted to a recipient.

Implementations may include one or more of the following features. For example, an advertising object may be stored at the intermediate location and the advertising object may be downloaded from the source or a content server. An advertising object may be transmitted to the intermediate device as part of the data stream.

Identifying the advertising descriptor may include referencing a selection rule, a modification rule, or an insertion rule from within the data stream. Referencing the selection rule may include referencing a selection rule and selecting, as the advertising object, an advertising object configured to avoid a conflict between one or more other advertising objects in the content selection. Selecting the advertising object configured to avoid the conflict may include selecting the advertising object in response to determining whether a competing product has appeared, appears, or will appear in the content selection. Selecting the advertising object configured to avoid the conflict may include determining whether the advertising object conflicts with a theme of the content selection, and if so, selecting a different object supporting the theme. Identifying the advertising descriptor may include referencing a temporal rule configured to promote selection of an advertising object based on temporal characteristics associated with the advertising object that are supported by the content selection.

Identifying the advertising descriptor may include referencing a preference rule associated with the recipient and configured to promote selection of an advertising object based on recipient preferences, referencing an identification code rule associated with the recipient and configured to promote selection of an advertising object based on an identification code identifying the advertising object, referencing a recipient demographics rule associated with the recipient and configured to promote selection of an advertising object based on demographics of the recipient, or referencing a selection weight rule configured to promote selection of an advertising object from a set of the available advertising objects using a selection weight associated with the advertising object.

Identifying the advertising descriptor may include referencing a rule configured to promote selection of an advertising object using a revenue objective, referencing a rule configured to promote selection of an advertising object using content selection descriptions, or referencing a rule configured to promote selection of an advertising object based on a placement location of the advertising object within the content selection. Referencing the modification rule may include specifying visual, audio, or temporal characteristics of the advertising object. Specifying the temporal characteristics may include specifying a sequence of visual states for the advertising object that varies over time. Referencing the insertion rule may include receiving an indication of an opportunity to render the advertising object at a specified time for a specified duration. Identifying the advertising descriptor may include analyzing metatags appearing within the data stream that describe one or more activities within the video content selection.

DETAILED DESCRIPTION

Figure 1:
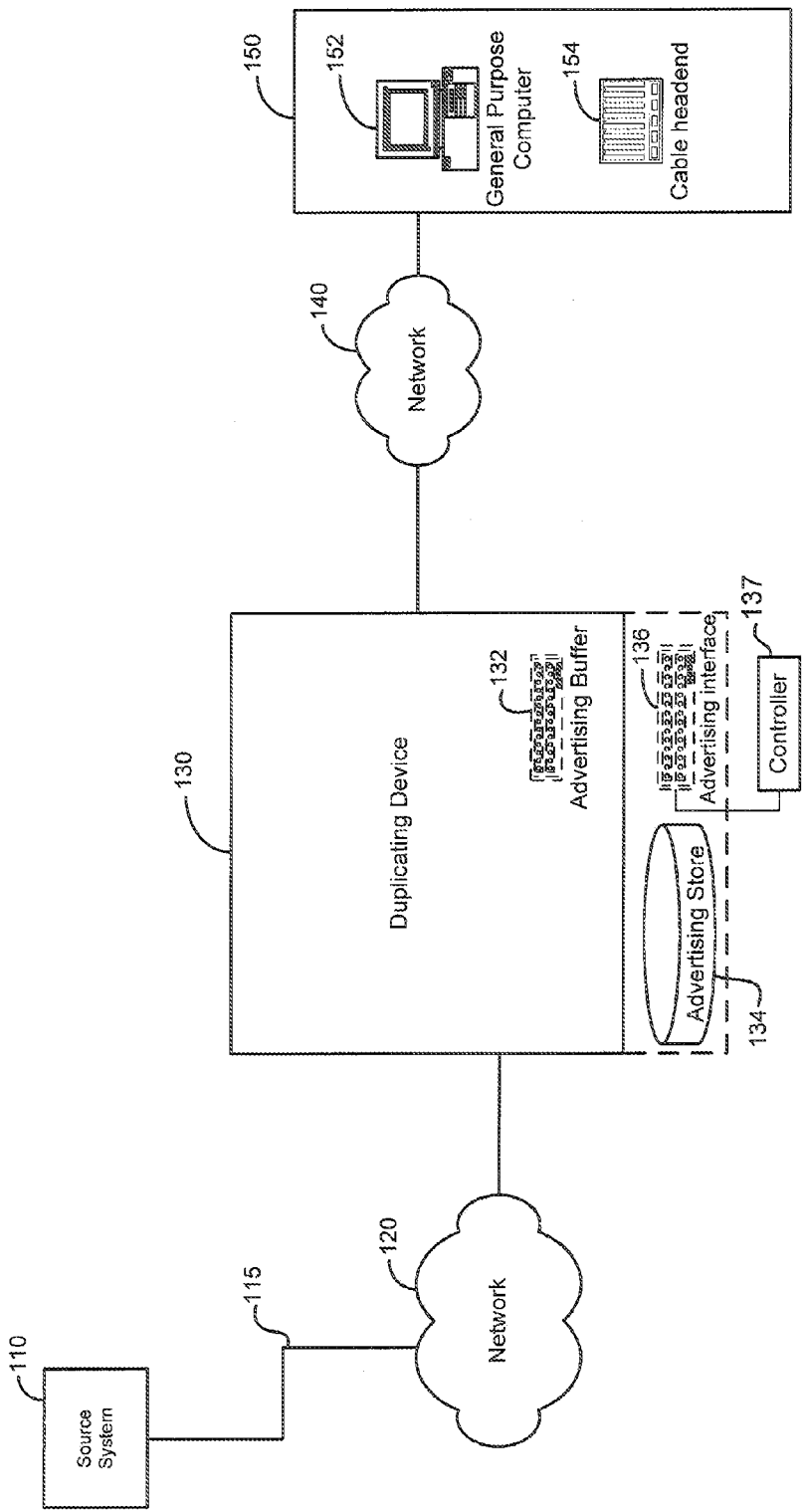
FIG. 1 is a block diagram of a communications system configured to insert advertisements into a streaming content.

Advertisement insertion systems and processes are described for facilitating insertion of advertising content into the streaming content, such as streaming video. For illustrative purposes, FIGS. 1-8 illustrate aspects of advertisement insertion systems and processes configured to render advertising objects in selected content such that the advertising objects appear as if the selected content originally featured the advertising objects.

Generally, a source system sends a streaming video with a content selection to an intermediary system. The intermediary system receives a data stream including a video content selection having scenes configured to accommodate insertion of advertising objects. The intermediary system identifies an advertising descriptor based on characteristics of a scene within the data stream, selecting an advertising object based on the identified advertising descriptor, selects an advertising object based on the referenced advertising descriptor, and modifies the video content selection by inserting the advertising object in the data stream such that the advertising object is integrated into a scene of the video content selection, where an image scene of the video content selection is modified to integrate and enable visual display of content from within the scene of the video content selection and the advertising object concurrently. Finally, the intermediary system transmits the content selection to a recipient.

The following example illustrates how advertising objects may be rendered accordingly. A source system, such as a streaming video server, transmits a video stream of a pre-recorded game show to an intermediary system. The incoming video stream is annotated with advertising descriptors, such as metatags that describe locations and types of advertising objects. The metatags may require or suggest advertising or content to be inserted into the video stream by the intermediary system. In this example, the advertising descriptors may require rendering of a Pepsi beverage bottle next to the contestant in a game show. The advertising descriptors require the bottle to have certain pre-specified dimensions, color, or other characteristics, for instance, the bottle may be required to be opened and half-empty. The intermediary system references the advertising descriptor located in the video stream, and, based on a set of selection rules, selects an advertising object, such as an image of 20 oz blue Diet Pepsi bottle. The intermediary system then renders an image of a Pepsi bottle in the scene location specified by the advertising descriptor and transmits the modified video stream to a recipient. The inserted image of a Pepsi bottle appears to the recipient as if the video of the game show originally featured the inserted bottle. In other words, the image ultimately rendered to the recipient is configured as if the Pepsi bottle stood next to the contestant when the show was being taped.

For brevity, several elements in the figures described below are represented as monolithic entities. However, as would be understood by one skilled in the art, these elements each may include numerous physically and/or logically interconnected computers and components designed to perform a set of specified operations and/or dedicated to a particular geographical region.

Referring to FIG. 1, communications system 100 includes a source system 110, a terminal 150, and communication software and hardware enabling communications between the source system 110 and the terminal 150. More particularly, the communications path between the source system 110 and the terminal 150 includes a network 120, a duplicating device 130, and a network 140. The source system 110 generally transmits one or more data units in a first stream of data units across network 120 to one or more duplicating devices 130 that duplicate data units or portions thereof and transmit the duplicated data units or data unit portions to two or more terminals 150 through network 140.

The source system 110 may be structured and arranged to convert a media source (e.g., a video or audio stream) into a first stream of data units for transmission across a network 120. The source system 110 may include a general-purpose computer having a central processor unit (CPU), and memory/storage devices that store data and various programs such as an operating system and one or more application programs. Other examples of a source system 110 include a workstation, a server, a special purpose device or component, a broadcast system, other equipment, or some combination thereof capable of responding to and executing instructions in a defined manner. The source system 110 also typically includes an input/output (I/O) device (e.g., video and audio input and conversion capability), and peripheral equipment such as a communications card or device (e.g., a modem or a network adapter) for exchanging data with the network 120.

A communications link 115 is used to communicate data between source system 110 and network 120. Communications link 115 may include, for example, a telephone line, a wireless network link, a cable network, or a direct connection.

The network 120 includes hardware and/or software capable of enabling direct or indirect communications between the source system 110 and the duplicating device 130. The network 120 is shown to include a direct link between the source system 110 and the device 130. However, it may include one or networks or subnetworks (not explicitly shown). Each network or subnetwork may include, for example, a wired or wireless data pathway capable of carrying and receiving data. Examples of network 120 include the Internet, the World Wide Web, a WAN ("Wide Area Network"), a LAN ("Local Area Network"), an analog or a digital wired and/or wireless telephone network (e.g., PSTN ("Public Switched Telephone Network"), ISDN ("Integrated Services Digital Network"), or xDSL ("any form of Digital Subscriber Loop")), a radio, television, cable, or satellite network, or any other delivery mechanism for carrying data.

The duplicating device 130 is structured and arranged to receive the first stream of data units from the source system 110, to duplicate the stream of data units, and to transmit a stream of duplicated data units to one or more terminals 150. In some implementations, the duplicating device 130 is structured and arranged to perform filtering and forwarding between different domains at the same level of the protocol stack in the OSI ("Open System Interconnection") reference model. For example, duplicating device 130 may forward Ethernet frames between different Ethernet segments. In another example, duplicating device 130 may forward IP packets between different IP subnets.

The duplicating device 130 may include a duplicating device. Generally, a duplicating device includes a device that performs network operations and functions in hardware (e.g., in a chip or part of chip). In some implementations, the duplicating device may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating device 130 may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating device 130 also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The duplicating device 130 also is shown to include an advertising buffer 132 structured and arranged to store one or more pieces of advertising content. Typically, the advertising buffer 132 is structured and arranged to enable timely insertion of one or more pieces of advertising content into the duplicated stream. Advertising content may include still and moving images, text, audio, or other types of media.

The duplicating device 130 also is shown to include an advertising store 134 structured and arranged to store one or more pieces of content for insertion. The advertising store 134 may be further partitioned into additional subsections (not shown), for example, each storing a different type of advertising data. As shown by the dotted lines, the advertising store 134 may reside locally on the duplicating device 130 or it may reside on a separate and distinct device, such as, for example, a separate server or duplicating device with storage. Although aspects of the advertising store 134 may resemble aspects of the advertising buffer 132, the advertising buffer 132 serves to provide timely access to the desired content while the advertising store 134 serves to provide more storage than typically is practical for the advertising buffer 132 to provide.

In the illustrated example, a duplicating device 130 includes both an advertising buffer 132 and an advertising store 134. In this example, the pool of available advertisements might reside in the advertising store 134 with the duplicating device 130 selecting required advertisements for loading to the advertising buffer 132 for just-in time splicing. Through this selective loading to the advertising buffer 132, the amount of buffer required may be reduced. However, while the advertising buffer 132 may illustrate one device to reduce solid-state memory requirements, the advertising store 134 also may be used to splice advertisements. For example, the duplicating device 130 may initially store a received stream onto a hard disk drive. Advertising content may be inserted into the received stream, and the results may be transmitted as the duplicated stream. Other examples may feature the use of a disk drive with adequate seek times as an advertising buffer 132. Similarly, the advertising store 134 also may include one or more solid-state memory devices (e.g., Random Access Memory).

The duplicating device 130 is shown to include an advertising interface 136, which typically includes a controller 137 structured and arranged to select, access, and insert one or more pieces of advertising content into the content selection of the data stream. Advertising content is represented by an advertising object. An advertising object is a data structure that may be a placeholder for advertising content with a link to the actual advertising content. Alternatively or in addition, an advertising object may store a part or all of the advertising content by itself. The controller 137 may select a specific advertisement object for insertion based on the advertising descriptor stored at the duplicating device. The selected advertising object may conflict with some parameters of the content selection. In one sense, the selected advertisement object may conflict with the overall theme of the content in the stream. For example, a selected advertising object, such as a beer bottle, may be inappropriate for insertion during a children's show or a health show. In a difference sense, the selected advertising object also may conflict with the other advertising objects placed in the stream. For example, if the selected advertising object is a Pepsi bottle, a conflict with other Coca-Cola advertising objects inserted into the content selection may result. The controller 137 may be configured to resolve such conflicts between advertising objects. Once the conflicts are resolved, the controller 137 may be configured to access a local advertisement store 134, the advertising buffer 132, or a remote content server across the network (e.g., network 120 or 140) to obtain the necessary data for the selected advertising object.

Furthermore, the controller 137 may be configured to modify the video content selection by inserting the advertising object in the data stream such that the advertising object is integrated into a scene of the video content selection, where an image scene of the video content selection is modified to integrate and enable visual display of content from within the scene of the video content selection and the advertising object concurrently. Thus, viewers of the modified content selection may perceive the advertising object for a product as part of the content selection. For example, while watching a game show, viewers may see a soft drink bottle on a contestant's table. However, in the original recording, the bottle space may be left as void space or populated with a bottle image or other information such as annotations or metatags that specify the requirements for advertising content. In general, metatags are placed (logically or temporally) within the stream to indicate the locations for advertising objects. In other words, metatags serve as placeholders for the actual advertising content that is inserted into the data stream by the duplicating devices. Metatags also may include information about the advertising space, such as the type of object that may be inserted into the space, the size, the shape, the 3D orientation, the color of the object, or the duration over which the advertising object my be inserted. The duplicating device receives the data stream, and, based on the embedded metatags, inserts an advertising object for a specific beverage, such as Pepsi, into the void advertising space annotated by metatags.

Data units handled by the duplicating device 130 may be accessed by or sent to terminals 150 through network 140. As such, the network 140 is structured and arranged to receive data units transmitted from the duplicating device 130 for transmission to the terminals 150.

The network 140 includes hardware and/or software capable of enabling direct or indirect communications between the duplicating device 130 and the terminal 150. The network 140 is shown to include a direct link between the duplicating device 130 and the terminal 150. However, it may include one or more networks or subnetworks (not shown). Each network or subnetwork may include, for example, a wired or wireless data pathway capable of carrying and receiving data. Examples of the delivery network include the examples noted above with respect to network 120. Network 120 and network 140 may share one or more hardware or software devices.

The terminal 150 may include one or more devices capable of receiving the duplicated stream transmitted by duplicating device 130 through network 140. The terminal 150 may include a controller (not shown) that processes instructions received from or generated by a software application, a program, a piece of code, a device, a computer, a computer system, or a combination thereof, which independently or collectively direct operations of the terminal 150. The instructions may be embodied permanently or temporarily in any type of machine, component, equipment, storage medium, or propagated signal that is capable of being delivered to the terminal 150 or that may reside with the controller at terminal 150. Terminal 150 is shown to include a general-purpose computer (e.g., a personal computer (PC) 152) capable of responding to and executing instructions in a defined manner. The terminal 150 also may include a workstation, a notebook computer, a PDA ("Personal Digital Assistant"), a wireless phone, a component, other equipment, or some combination of these items that is capable of responding to and executing instructions.

In one implementation, the terminal 150 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, terminal 150 may include a wireless telephone running a micro-browser application on a reduced operating system with general purpose and specialized hardware capable of operating in mobile environments.

The terminal 150 also is shown to include a cable headend 154. Typically, aspects of the cable headend 154 resemble aspects of the terminal 150 and/or the PC 152 described above. For example, the cable headend 154 may include one or more software applications to retrieve content. Thus, a cable headend 154 may retrieve required content and sent it out on a cable distribution program as regularly scheduled programming on a specified cable channel.

However, aspects of the cable headend 154 typically differ in that the cable headend may be structured and arranged to act as a proxy for one or more devices (e.g., a set top tuner). While a PC may be configured to act as a proxy for one or more devices, it may be useful to configure the cable headend 154 to aggregate information reflecting the state of one or more constituent subscribers, in addition to state information for the cable headend itself. For example, a cable headend 154 may be configured to aggregate one or more individual profiles. This aggregated profile is modified, tracked, and changed in the same manner that the state of a PC could be modified, tracked and changed. The difference is that the cable headend 154 may involve additional processing to aggregate the individual profiles/states.

Figure 2:
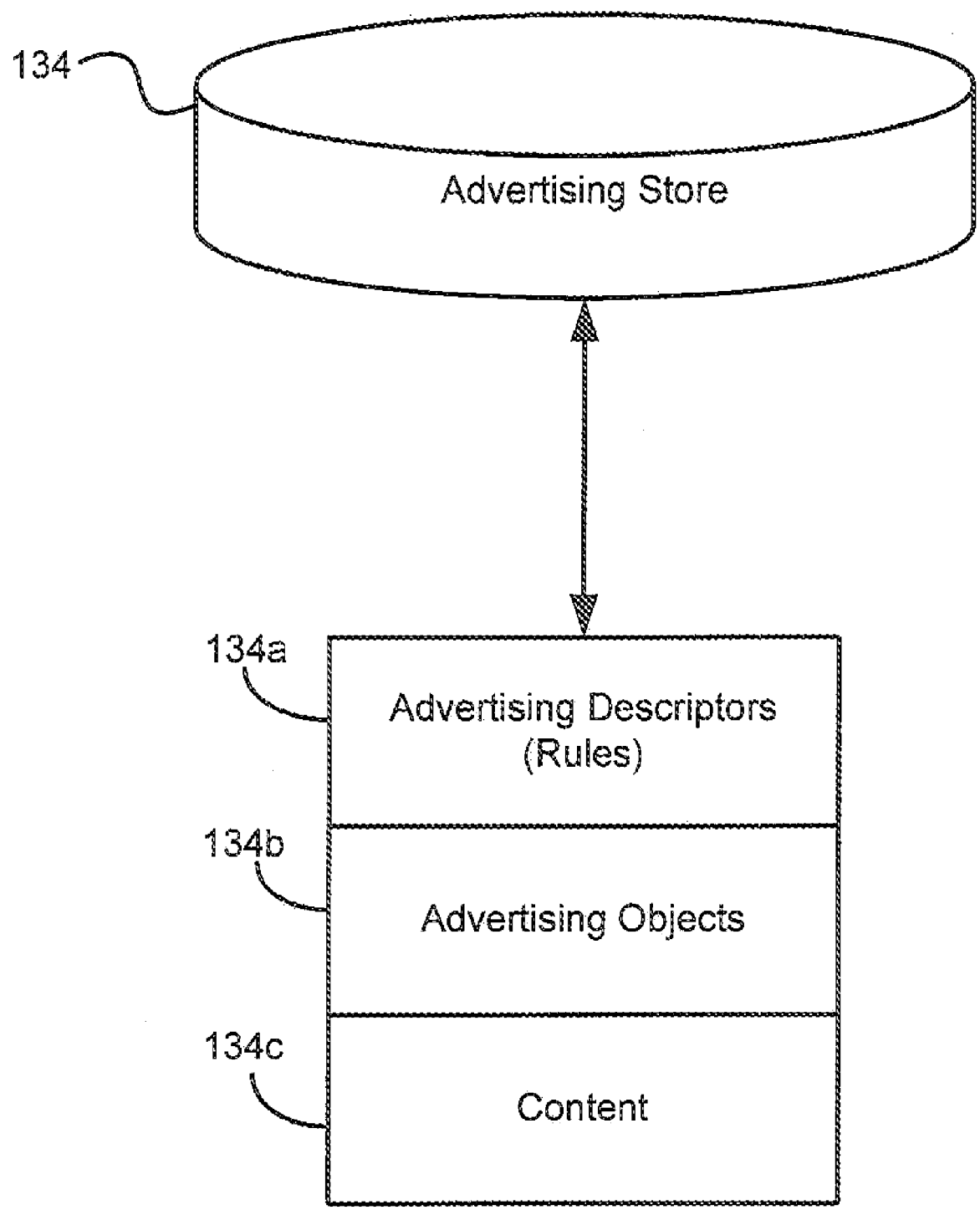
FIG. 2 is a block diagram of an advertising data store configured to store data associated with various aspects of advertisement insertion system.

FIG. 2 illustrates an advertising store 134 structured and arranged to store data utilized during advertisement insertion. The advertising store 134 may be portioned into multiple sections configured to store different types of data used by the controller 137 for insertion of advertisements. The illustrated advertising store 134 includes an advertising descriptor section 134a, an advertising objects section 134b, and a content section 134c.

The advertising descriptor section 134a represents data related to advertising descriptors. An advertising descriptor may be configured to instruct a controller (e.g., controller 137) how to insert advertising objects into a data stream. Alternatively or in addition, the advertising descriptor may be configured to instruct the controller 137 on how advertising objects may be inserted, deleted, or modified. The advertising descriptor section 134a may include rules used by the controller 137 to select an appropriate advertising content for insertion. The rules may control selection, insertion, or modification of advertising objects. The rules may be specified in a variety of ways. For example, the rules may be stored in form of a text files, such as a Python scripts or XML data files. Additionally or alternatively, the rules may be specified visually, using a rule-specification GUI (Graphical User Interface).

Advertising descriptors may be configured to select specific data streams for advertisement insertion based on a variety of criteria. The criteria may include source groups, recipient groups, types of content, keywords, and other parameters. Once an incoming stream matches the criteria of an advertising descriptor, the set of selection/insertion/modification rules specified in that advertising descriptor are applied to the content of the incoming stream. In other words, the advertising descriptor may be configured to act as a classifying filter that determines whether an incoming stream is chosen for advertisement insertion at the duplicating device 130. The groups of sources or recipients

TABLE 1

```
descriptor NY_Sports_Fan {                          group {
            match SRC_IP_PREFIX        133.160.0.0/16    OR
            match DEST_IP_PREFIX       251.134.0.0/16    OR
            match USR_ZIP_CODE         11235             OR
            match USR_CITY             New York   OR
            match USR_AREA             North East OR
            match USR_PREFERENCE       football, hockey, sports, Giants, Knicks OR
            match USR_TYPE             male, female OR
            match USR_AGE              21-45         AND
            match USR_INCOME           10,000 to 250,000 AND
            match CONTENT_TYPE         sports, baseball, hockey
            }
    rules{
        SELECTION_RULE =        select_NY_Sports_Fan_rl
        INSERTION_RULE =        insert_NY_Sports_Fan_rl
        MODIFICATION_RULE =     modify_NY_Sports_Fan_rl
        }
}}
``` may be specified based on IP addresses, geographic locations, interest/programming types, service options, demographics, and other criteria. Additionally or alternatively, the advertising descriptor section 134a may include a default or modifiable descriptor that is applicable for multiple streams.

Table 1 shows an exemplary advertising descriptor NY_Sports_Fan that is configured to match a group of New York sports fans based on their geographical location (NY or North East), age (21-45), IP addresses, and other criteria. If there is a stream passing through the duplicating device 130 that matches the NY_Sports_Fan descriptor, the set of selection/insertion/modification rules specified by the NY_Sports_ Fan descriptor will be applied to the content in that stream.

Table 2 shows an exemplary selection rule for a NY sports fan, which is identified among the rules to be applied based upon the NY_Sports_Fan advertising descriptor shown in Table 1. Selection rules may be configured to instruct the controller 137 to determine which advertising objects need to be selected for insertion, deletion, or modification. Selection rules also may specify conflict resolution procedures to be used when advertising objects are eligible for placement in the same stream. For example, a conflict between competing advertisers or between the selected advertising objects and the theme of the content selection may be identified. The controller 137 may be configured to prevent advertiser-related conflicts that occur when advertising objects from competing businesses, such as Coke and Pepsi, are placed within the same video scene. Similarly, the controller 137 may be configured to enforce theme-related rules that prevent theme-related conflicts. One such rule, for example, may be configured to disable beer advertisements during children shows. Alternatively or in addition, selection rules may be configured to select advertising objects based on other factors, such as temporal characteristics of advertising objects, cost of advertisements, and/or viewer preferences. For example, a first viewer may prefer trucks to convertibles. Similarly, a second viewer may dislike professional sports, while preferring collegiate athletics. In any event, aspects of these preferences may appear in selection rules used to select advertising objects.

TABLE 2

```
rule select__NY__Sports__Fan__rl {
    match OBJECT__TYPE         bottle__16__oz, bottle__20__oz
    match OBJECT__MFCR         Budwiser
    match OBJECT__SIZE         200 pxl
    match OBJECT__COLOR        blue, green, navy
    match OBJECT__DURATION     10 seconds
    match OBJECT__AD__COST     >= 0.10
    match AD__COST__TOTAL      < 10,000
    match PROGRAM__TYPE        sports__game
    match OBJECT__CODE         BUDWSR__BT__16__BLUE
    match USR__PREFERENCE      can, bottle
    conflicts{
        match OBJECT__TYPE     BEER
        match OBJECT__MFCR     Miller, Amstel, (NOT BUDWSR)
        match PROGRAM__TYPE    news__report
        match                  NOT children
        PROGRAM__AUDIENCE
    }
}
```

Modification rules may be configured to instruct the controller 137 to modify advertising content in order to render it into the data stream. Specifically, modification rules may specify how an advertisement's visual, audio, or temporal characteristics may be changed during the insertion. For example, the controller 137 may change an image for an advertisement to blue, set the on-screen duration to 1 minute, and mute any sounds associated with the advertisement. In yet another example, a modification rule may specify how the object is changed over time. For example, to achieve a realistic effect, a Pepsi bottle may need to be depleted over the course of time, because the contestant on the show is drinking from it. Therefore, a modification rule may be specified which dictates how the level of beverage in the inserted bottle object changes with time. Similarly, other characteristics of the Pepsi bottle may be modified to make its appearance more realistic. Table 3 shows an exemplary modification rule for the NY sports fan.

TABLE 3

```
rule modify__NY__Sports__Fan__rl {
    video {
            scale = true; 75%
            shape = same
            duration = 1 minute
                color{
                    fg = blue
                    bg = same
                    hue = 30%
                    saturation = 80%
                    brightness = 70%
                }
    }
    audio{
            track = same
            mute = true
    }
    text {
            new__text = "drink Pepsi"
            font = Courier
            size = 34
    }
}
```

Insertion rules, such as the one shown in Table 4, may be configured to instruct the controller 137 to insert, remove, or modify the advertising objects matching the specified selection rules. The controller 137 may insert a new advertisement into the content selection, or modify or delete an advertisement already placed inside the stream. If a modification rule is specified in an advertising descriptor, the modification rule may be applied to a new advertising object before it is inserted in the content selection or to an already-existing advertising object located within the content selection. Alternatively or in addition, the insertion rules may be configured to specify the times when the advertising objects are inserted, the duration of the insertion, and/or other information associated with repeating or temporal characteristics of the insertion/modification/deletion. For example, an insertion rule may specify that an advertising object is inserted every 5 minutes for 30 seconds. In another example, an insertion rule may specify that a certain advertising object is removed or blacked out for 10 seconds. In yet another configuration, the duplicating device 130 may be configured to receive the stream from other duplicating devices. In this configuration, the duplicating device 130 may be configured to replace parts of the upstream advertising with its own. For example, the source system 110 may insert most of the national-level advertisements into the data stream at the time of transmission, but leave some of the empty spaces for local advertisements. The downstream device 130 may then remove some the original advertisements from the stream or replace them with advertisements that target local viewers.

Advertising objects may include imagery-related content in variety of formats, such as still and moving images, text, or audio objects. In addition, advertising objects may be specifically pre-formatted for easier insertion into a content selection. For example, a sequence of images may be pre-rendered in a variety of resolutions, orientations, sizes, colors, backgrounds, or shades in order to accelerate the insertion process and avoid on-line processing. Likewise, other advertising objects may vary in duration or richness, where richness refers to the amount of detail or information.

An advertising object may describe a range of activities. For example, an advertising object may instruct the loading of three different advertising objects in a buffer (e.g., advertising buffer 132) from an advertising library (e.g., advertising store 134) of twenty pieces. In another example, the duplicating device 130 uses advertising interface 333 to retrieve the required advertisements from an off-device media library.

TABLE 4

```
rule insert_NY_Sports_Fan_rl {
    operation  INSERT
    time_in    3:51
    duration   4.0
    repeat     every 1.2 hrs}
```

The advertising object section 134b stores data related to advertising objects. In one implementation, an advertising object may be a placeholder for advertising content with a link to the actual advertising content, stored in the content storing section 134c. Alternatively or in addition, an advertising object also may store all or a part of the advertising content by itself, and may include descriptive information about advertising content, such as type, duration, and visual/audio characteristics. The controller 137 applies selection rules to the characteristics of advertising objects and selects advertising objects that match the requirements set by the selection rules. Once the specific advertising object is selected by the controller 137, the content for the advertising object is retrieved either from the advertising object itself or from the content storing section 134c via a link (or a pointer) from the advertising object. The controller 137 then renders the advertising object into content selection following the guidelines established by the selection, modification, and insertion rules. Even after insertion into the stream, the inserted advertising objects may be demarcated with metatags. These metatags specify characteristics of the inserted advertising objects. Such information may enable, among other things, filtering or modification of the inserted advertising objects at the downstream duplicating devices or at a recipient's terminal.

Advertising content may include a variety of media objects, such as still and moving images, text, or audio objects (e.g., text may be rendered as if printed on the side of an object). In addition, advertising objects may be accessed by a link to similar content that is specifically pre-formatted for easier insertion into the stream. For example, imagery of a single object may be reformatted in a variety of resolutions, orientations, sizes, colors, backgrounds, or shades in order to speed up the insertion process and avoid on-line processing. Likewise, an advertising object may be formatted in a variety of durations or richness, where richness refers to the amount of detail or information.

Furthermore, an inventory management system may be provided for managing advertising content. The inventory management system may be text-driven, graphics-driven, or a combination of both. The inventory management system may be deployed at the duplicating devices 130, at the content sources, or at other locations. Advertisers, operators of the streaming equipment, or third parties may use the inventory management system to specify the content used for advertising insertion. Generally, the inventory management system provides an interface to the data stored in the content storing section 134c. Hence, the inventory management system enables a user of the system to search, add, delete, or modify advertisement content. For example, using the inventory system, a system operator also may quickly search/browse for a specific image of a 20 oz Pepsi bottle. If the image is not stored in the system, the operator may add the image to the inventory, or send a request to the graphics department for creation of such an image. The inventory management system also may be configured to enable a system operator to set various parameters associated with the advertising content, such as display characteristics, pricing information, or theme information. In one implementation, the inventory management system specifies a background audio selection that should accompany the advertising. In another implementation, the inventory management system includes a text selection configured to support different languages. In yet another implementation, the inventory management system may specify whether a subdued or prominent color scheme should be used to render the advertising object.

Figure 3:
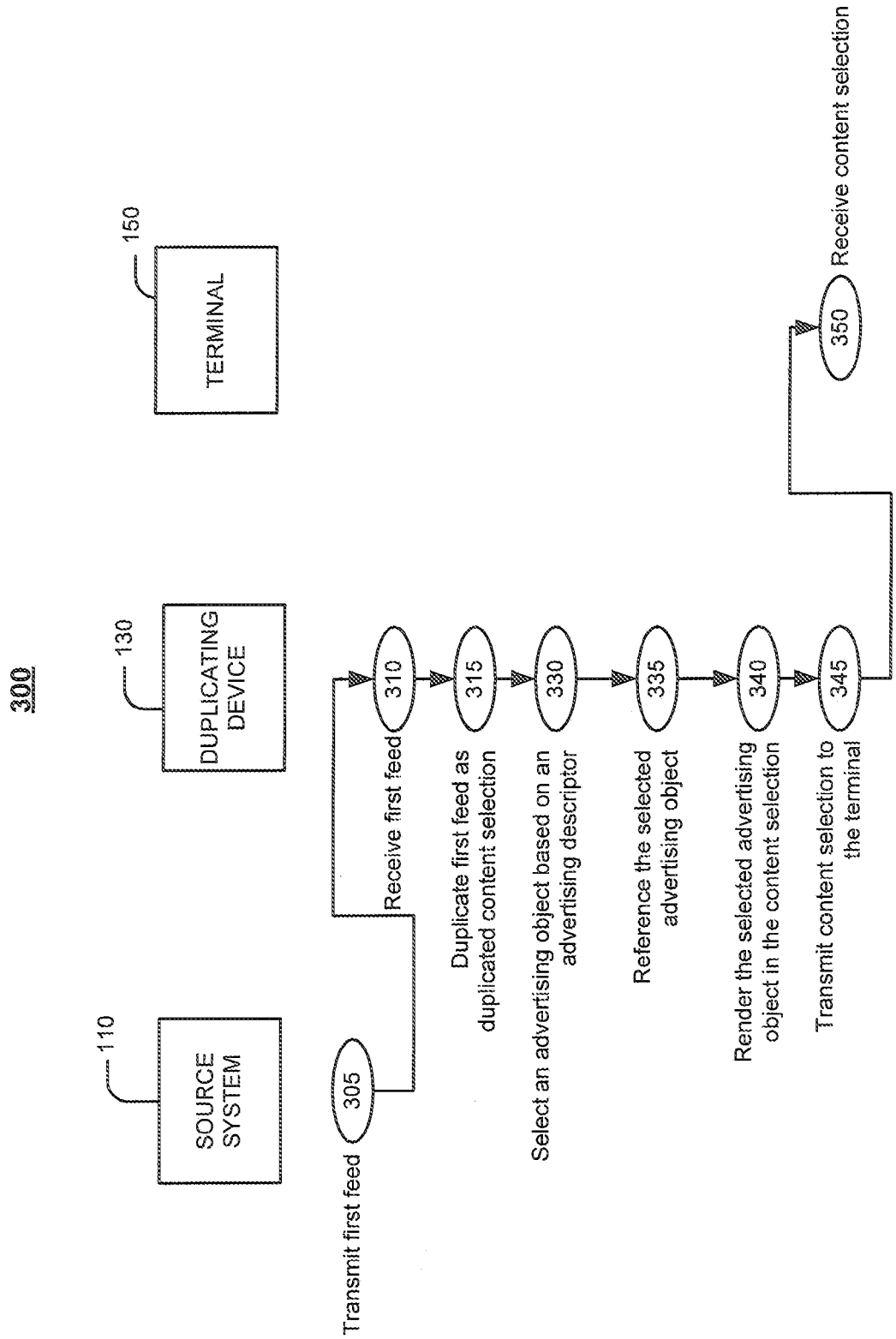
FIG. 3 is a flow chart illustrating how advertisements may be inserted into a duplicated feed in a communications system, such as the communications system in FIG. 1.

FIG. 3 illustrates how advertisements may be inserted in a communications system 100. Specifically, FIG. 3 illustrates how a duplicating device 130 receives a data stream including a video content selection having scenes configured to accommodate insertion of advertising objects, identifies an advertising descriptor based on characteristics of a scene within the data stream, selects an advertising object based on the identified advertising descriptor, and modifies the video content selection by inserting the advertising object in the data stream such that the advertising object is integrated into a scene of the video content selection, where an image scene of the video content selection is modified to integrate and enable visual display of content from within the scene of the video content selection and the advertising object concurrently.

Initially, the source system 100 transmits a data stream (305). Examples of the first stream (e.g., stream of data units) may include a video stream (e.g., television programming). The duplicating device 130 receives the data stream including a video content selection having scenes configured to accommodate insertion of advertising objects (310). The duplicating device 130 may receive the stream for the purpose of duplicating the video stream. Although duplicating the first stream may be performed in response to receiving the first stream, duplicating the first stream is not required to be performed first upon receiving the first stream. Furthermore, duplicating the first stream may refer to a broad spectrum of activities.

In one example, duplicating the first stream may refer to storing the first stream in a buffer. Storing this stream may enable rapid duplication of the content as a duplicated stream by adding and replacing new header information to enable simultaneous access to the content by multiple terminals. Another example may include storing the packet with address fields in the buffer. The address fields may be modified to represent the addresses corresponding to one or more terminals. Other implementations may receive the first stream, duplicate the stream, and transmit the stream to one or more terminals, without necessarily waiting for state information to be provided unless advertisements are required.

Independently, or in response to receipt of the first stream by the duplicating device 130, the controller 137 identifies an advertising descriptor based on characteristics of a scene within the data stream (315). The advertising descriptor may include a number of rules, such as those illustrated and described with respect to Table 1, that help the controller 137 select an appropriate advertising object for insertion.

After identifying the advertising descriptor, the duplicating device 130 selects an advertising object based on the identified advertising descriptor (320). For example, the duplicating device may retrieve the advertising object from a buffer. The duplicating device 130 then modifies the video content selection by inserting the advertising object in the data stream such that the advertising object is integrated into a scene of the video content selection, where an image scene of the video content selection is modified to integrate and enable visual display of content from within the scene of the video content selection and the advertising object concurrently (325). In addition, the controller 137 may modify some properties of advertising objects in order to render the advertising object more realistic. For example, the controller 137 may change the color, shape, or other visual characteristics of advertising objects before inserting it into the content selection. In another example, the controller 137 may change temporal characteristics of the advertising object, such as duration, in order to seamlessly fit the advertising object into the content selection. Finally, the controller 137 also may directly modify the duplicated stream's visual or temporal characteristics. The duplicating device 130 transmits the content selection to a recipient (330). The recipient 150 receives the content selection (335). Receiving the duplicated stream may involve a handshaking process to coordinate flow control and stream reception. For example, the duplicating device 130 may transmit the stream as a TCP ("Transport Control Protocol") stream and use TCP's handshaking capability to minimize the likelihood of dropped data. This handshaking process may verify that a terminal has received advertising content.

Figure 4:
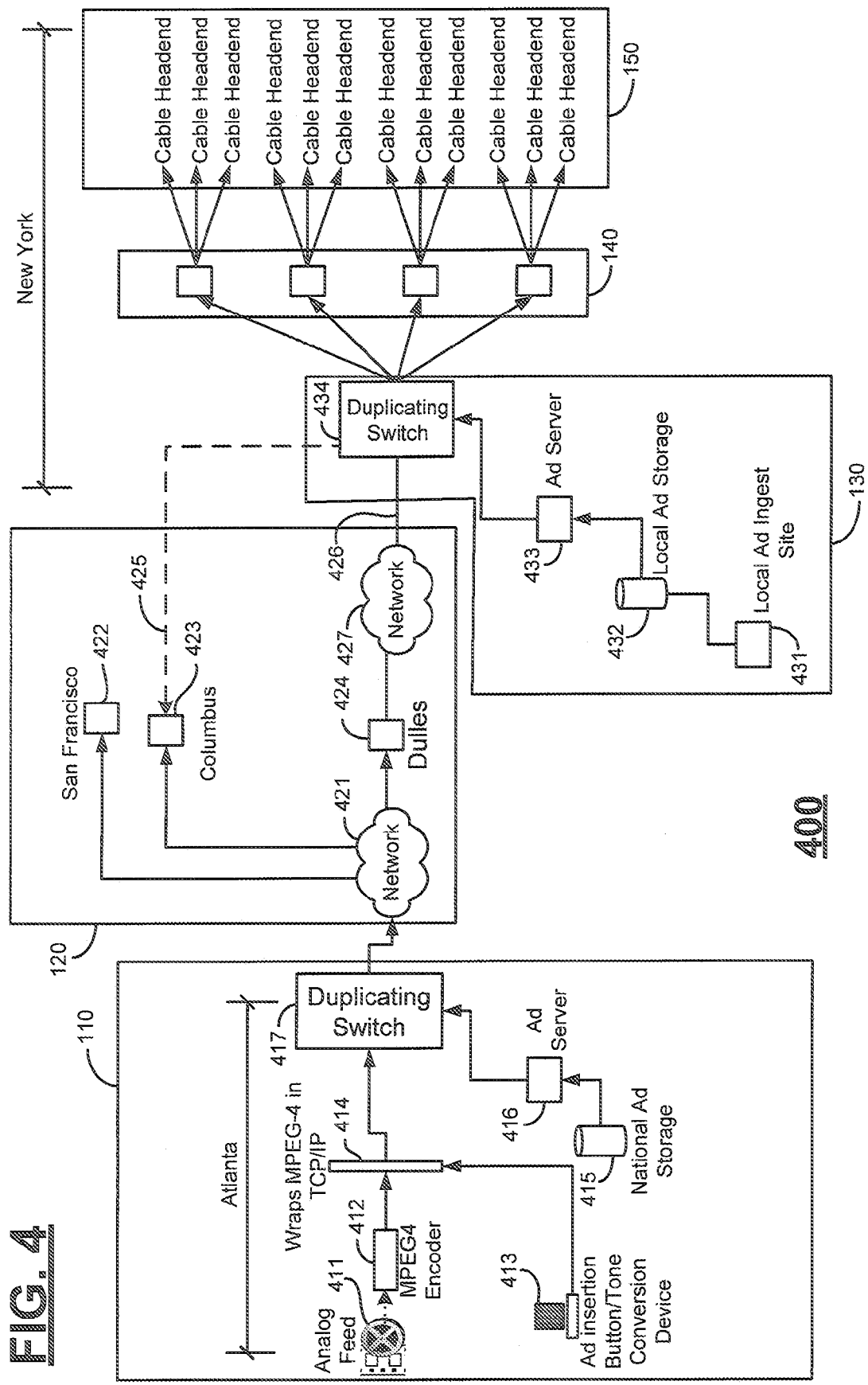
FIG. 4 is a block diagram of a communications system configured to enable national and local advertising insertion.

FIG. 4 illustrates an example of a communication system 400 that enables national and local advertising to be sent to one or more terminals. Generally, aspects of the system described with respect to FIG. 4 are consistent with aspects of the system described with respect to FIG. 1. For example, both system 100 and system 400 include a source system 110, networks 120 and 140, a duplicating device 130, and a terminal 150. However, unlike the system shown by FIG. 1, the system 400 shown by FIG. 4 typically is modified to address a two-tiered advertising system associated with national and local advertising. Thus, aspects of the system 400 also may or may not be present, whether or not shown, in the system 100. For example, the source system 110 may be configured to include an analog stream 411 but network 120 may not include a link to San Francisco, even though both of these aspects are shown in FIG. 4.

Source system 110 typically includes a device structured and arranged to send out a 'national' stream through network 120 to one or more duplicating devices 130 acting as local content insertion points. When implemented as illustrated in FIG. 4, source system 110 includes an analog stream 411, an MPEG-4 (Motion Picture Experts Group 4) encoder 412, an advertising insertion device 413, a conversion device 414, a national advertising storage 415, an advertising server 416, and a duplicating device 417. As such, the source system 110 is structured and arranged to convert the analog stream 411 into MPEG-4 stream using the MPEG-4 encoder 412. The source system may insert metatags into the MPEG-4 stream. These metatags specify the requirements for advertising content and are used by the duplicating device 130 to insert advertisements. The metatag insertion process may use a proprietary method, such as a video-editing suite, or a technology already available from MPEG-4. For example, Binary Format for Scene (BIFS) may be used to embed metatags into the MPEG-4 stream. BIFS is the MPEG-4's scene description language designed for representing, delivering, and rendering interactive and rich media services, such as audio, video, 2D, and 3D graphics.

The conversion device 414 is structured and arranged to wrap the MPEG-4 stream into an IP stream with advertising insertion points using advertising insertion device 413. Duplicating device 417 is structured and arranged to access national advertising storage 415 through advertising server 416 to insert advertising content into the IP stream sent from conversion device 414. Thus, aspects of the source system in FIG. 4 may resemble aspects of the duplicating device described previously. However, in FIG. 4, duplicating device 417 interfaces with another duplicating device 130 instead of interfacing with a terminal 150.

Although FIG. 4 illustrates a two-tiered system of advertising insertion, implementations may include using more than two tiers of duplicating devices. For example, a carrier may include international, national, regional, and local tiers. Moreover, the duplicating devices need not be assigned to hierarchies. For example, a duplicating device closest to the stream may be accessed as the first device for inserting advertising content. This first device may send one or more streams to a second tier of duplicating devices. These second tier devices may send their streams with additional inserted advertising content to a third tier of duplicating devices. Although the tiers may be geographically oriented, other orientations may be used. For example, the second and third tiers may represent different distributor and subscriber groups.

Network 120 includes several connections from the source system 110 to the duplicating device 130. For example, network 421 includes links to San Francisco 422, Columbus 423, and Dulles 424. These connections to different locations may include redundant links to one or more duplicating devices 130. For example, there is a redundant link 425 between a Columbus link 423 and a Dulles link 426 (through network 427) to reach duplicating device 130.

Duplicating device 130 includes one or more devices structured and arranged to modify the video content selection by inserting the advertising object in the data stream such that the advertising object is integrated into a scene of the video content selection, where an image scene of the video content selection is modified to integrate and enable visual display of content from within the scene of the video content selection and the advertising object concurrently. Duplicating device 130 includes a local advertising ingest site 431, a local advertising storage device 432, and advertising server 433, and a duplicating device 434. In general, duplicating device 130 receives local advertising content in a local advertising content ingest site 431. For example, the local advertising ingest device 431 may include a device that converts one or more tapes of advertisements into a MPEG-4 file. This advertising content (represented by advertising objects) may reside on local advertising storage 432 to be accessed by an advertising server 433. The duplicating device 434 may access the advertising server 433 to access local advertisements.

Although the duplicating device 130 is described with respect to having the local advertising ingest device 431 stream into the local advertising storage 432, having the local advertising server 432 stream into the advertising server 433, and having the advertising 433 stream into the duplicating device 434, other implementations need not include all of these devices. Rather, these devices illustrate the functionality that may be present at a local advertising content insertion site. For example, the duplicating device 130 might only include a duplicating device 434. This duplicating device 434 may include functionality to receive advertising content from one or more sources. These sources may include an analog conversion interface blade on the duplicating device 434, storage residing on the duplicating device, and/or a networked the controller configured to retrieve advertisements.

The duplicating device 130 may interface with the network 140 to reach the terminal 150, which in this case is the cable headend. Because of the functionality of the cable headend equipment, aspects of the network 140 may be indistinguishable from aspects of the terminal 150. For example, network 140 may include network equipment configured to connect the duplicating device 130 to a cable headend. The network equipment may terminate a portion of the communications (e.g., to modulate onto channels for tuners) with a portion of the communications being forwarded as Internet traffic over the cable system to consumers. Irrespective of which devices are labeled as the network or the terminals, the duplicating device transmits the duplicated stream in response to the state of the terminal, which may be a cable headend or a PC behind the cable headend accessing the Internet.

Figure 5:
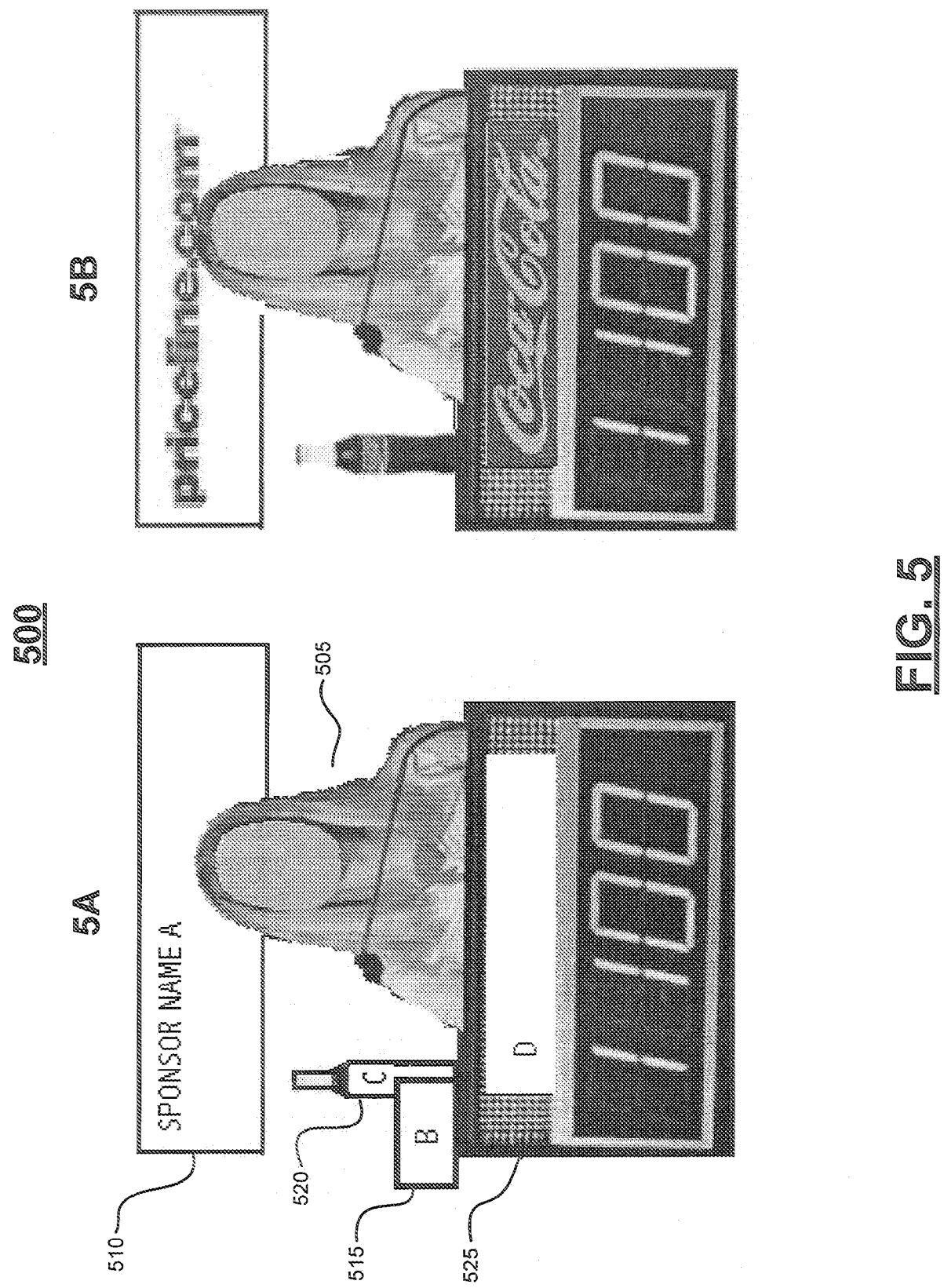
FIG. 5 illustrates how metatags may be used to annotate the insertion spaces for advertising content within a stream of data units.

FIG. 5 illustrates how metatags may be used to annotate the insertion spaces for advertising content within a stream of data units. In general, metatags are placed (logically or temporally) within the stream to indicate the locations for advertising objects. In other words, metatags serve as placeholders for the actual advertising content that is inserted into the data stream by the duplicating devices.

Metatags may be created in a number of ways. For example, metatags may be created through a video-editing suite at the data stream source. The controller 137 also may dynamically generate metatags, based on automatic recognition of possible places for insertion of advertising objects within the data stream.

A scene 5A corresponding to a video frame within the stream includes an exemplary contestant 505 in a studio environment. The contestant is surrounded by a variety of objects. Some of these objects may be used for product placement. For example, the space behind the contestant, the soft drinks on the podium, and the space in front of the podium may be used for advertisements. As a result, the objects are respectively annotated by metatags 510, 515, 520, and 525 in the original content selection. Metatags include information about the advertising space, such as the type of object that may be inserted into the space, the size, the shape, the 3D orientation, the color of the object, or the duration over which the advertising object my be inserted. For example, metatag 520 may specify that the inserted advertising object should have a bottle shape, be 500 by 250 pixels, have red color, and is able to appear for 10 seconds on the screen.

In addition, the metatag 520 also may specify at least one preferred advertiser or product category. For instance, metatags may include a list of preferred advertisers, such as Pepsi, Coke, or Nestea. The controller 137 then may be configured to select from among the preferred advertisers and inserting advertising objects of the selected advertisers. Additionally or alternatively, the metatag 520 may leave the selection of advertisers to the duplicating device 130. In this case, the controller 137 may select advertising objects based on the rules included in the advertising descriptor stored on the duplicating device 130.

Metatags also may include special identification codes that may help the duplicating device 130 to select the specific advertising objects (or types of objects) requested by the advertisers. For example, if a metatag carries a code PEPSI_BT_20_RD, the duplicating device 130 may be configured to decode the identification code as a requirement by the advertiser to insert an image of the red 20 oz Pepsi bottle.

A scene 5B illustrates an exemplary result in response to inserting an advertising object. As seen in the figure, object 515 has been removed from the frame, while objects 510, 520, and 525 have been populated with the actual advertisements. In one implementation, object 515 has been removed because an advertiser failed to purchase the advertising opportunity. In another implementation, the advertising inventory manager may have determined that aspects of object 515 were in conflict with aspects of another object being rendered. However, a viewer perceives advertising objects in scene 5B appear as if the advertising object were present during the recording of the original show.

Figure 6:
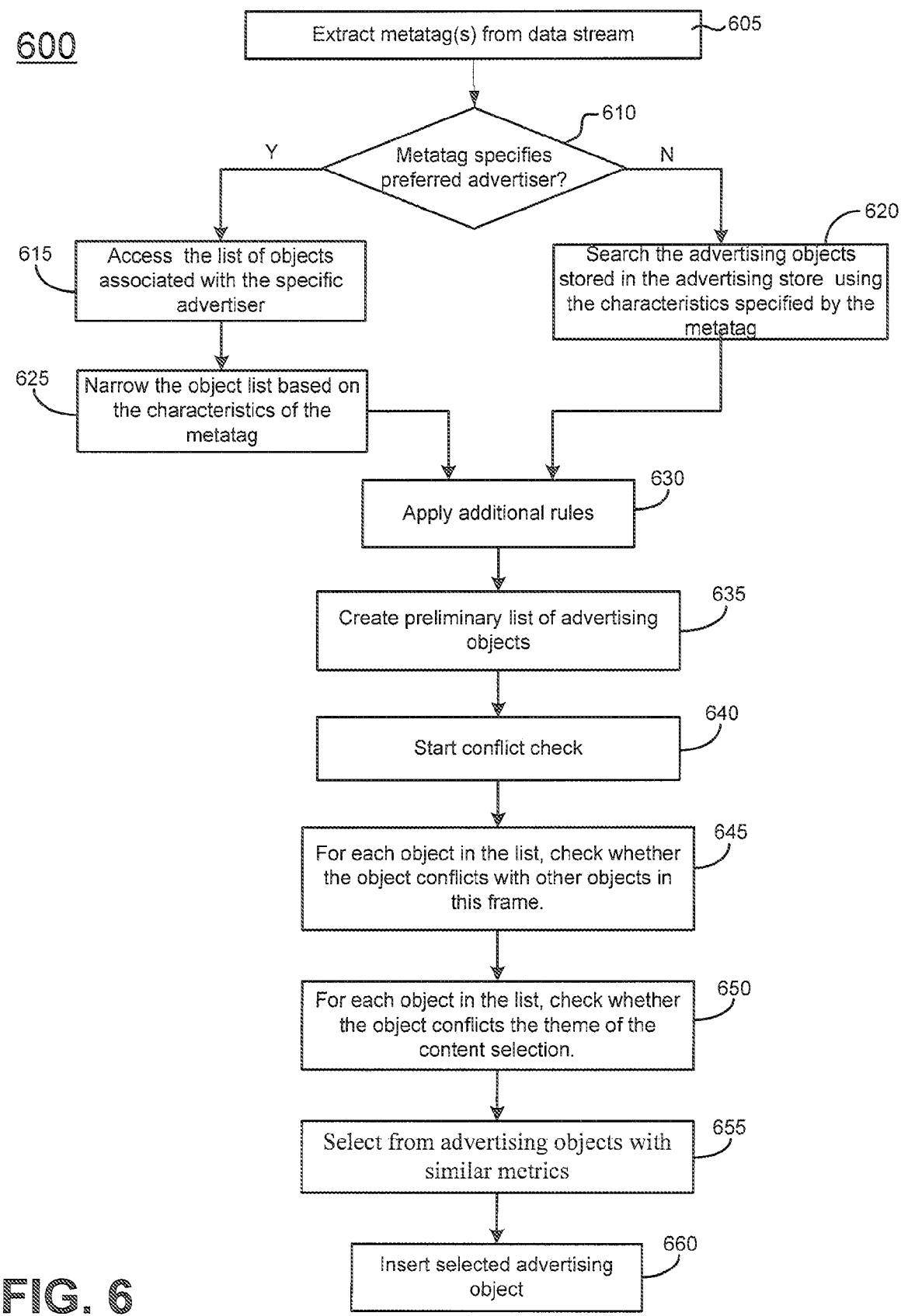
FIG. 6 is a flow chart illustrating how a communications system may select advertising objects by processing metatags.
Figure 7:
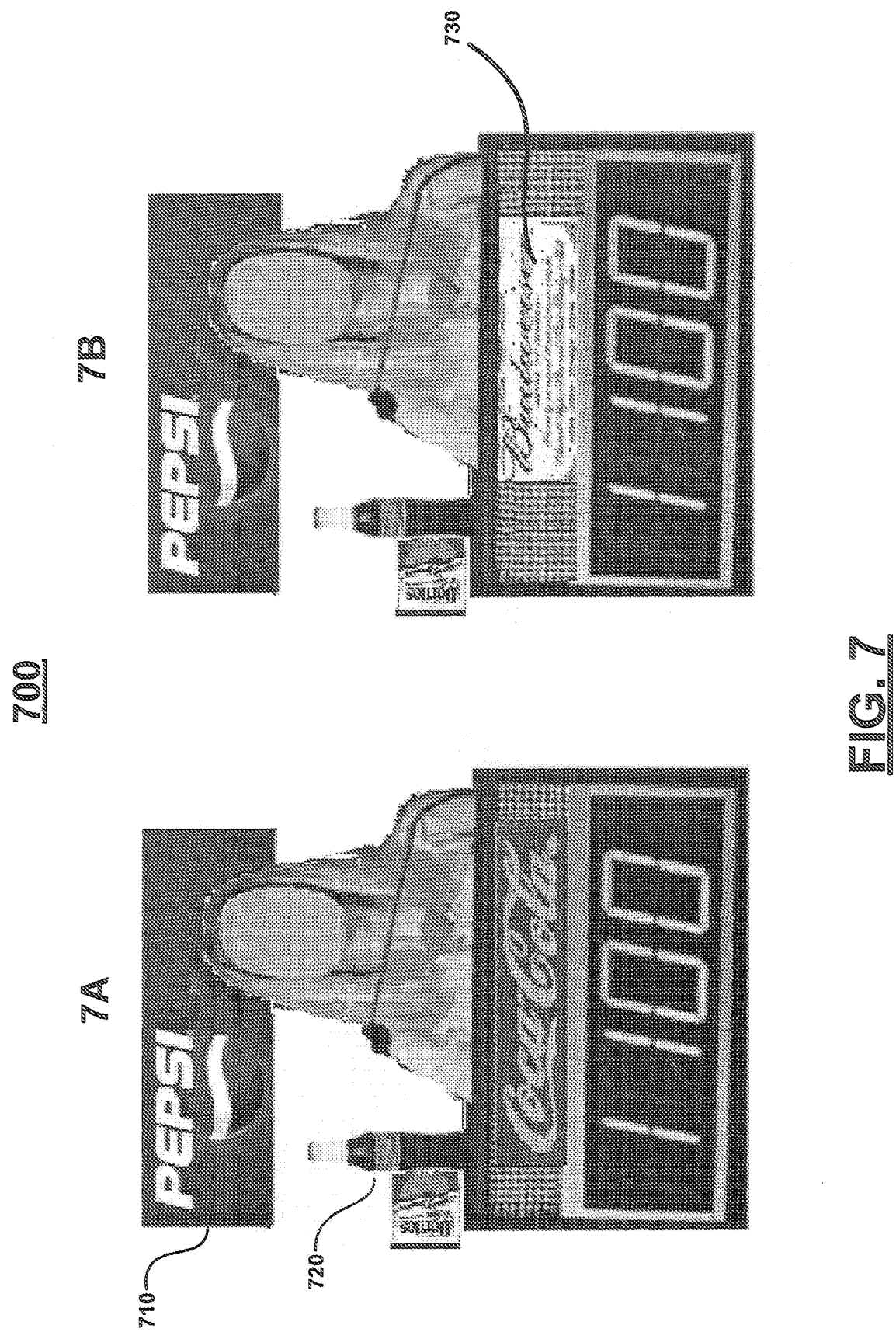
FIGS. 7A-B are screen displays of potential conflicts between advertising objects in the content selection.

FIG. 6 provides a flow chart 600 that shows how the controller 137 selects an advertising object for insertion. In general, aspects of FIG. 6 relate to FIG. 2 and illustrate how advertising objects may be selected by the controller 137. Initially, the controller extracts the metatag from the data stream (605). Extracting a metatag may include placing the metatag in a temporary buffer for further processing.

Next, the controller 137 determines whether the metatag specifies a preferred advertiser (610). For instance, metatags may include a list of preferred advertisers, such as Pepsi, Coke, or Nestea. When a preferred advertiser has been specified, the controller 137 may be configured to only access advertising objects associated with the specified advertisers (615). In another implementation, the selection of one advertising object may trigger the selection of other objects. For example, if one Pepsi advertising object is selected, the controller 137 may select the rest of the advertising objects from a pool of advertising objects associated with PepsiCo, such as Frito-Lay and Tropicana.

Additionally or alternatively, the metatag may enable the duplicating device 130 to select advertising objects. For example, the controller 137 may search the advertising objects stored in the advertising store 134 using the characteristics specified by the metatag (620). Similarly, the controller 137 narrows the object list based on the characteristics of the metatag (625). The lists of advertising objects may be narrowed in response to receiving characteristics, such as limited storage, or identification of the type of advertising object that may be inserted into the space, and/or other restrictions based on the size, shape, color of the advertising object, or the duration over which the advertising object will appear.

To further better select an advertising object, the controller 137 applies additional rules using the advertising descriptor (630). For example, these advertising descriptors may control the temporal characteristics associated with the advertising object. The controller 137 may select advertising objects during the pre-defined time periods. For example, the controller 137 may attempt to insert a Pepsi bottle every five minutes (if possible and/or the content selection supports rendering the Pepsi bottle). In another example, the controller 137 may select advertising objects based on a duration of a segment, or the duration specified in the metatag. Additionally or alternatively, the controller 137 may apply other selection rules to select the advertising object. The advertising object may be selected based on the terminal preferences, such as end-user demographics or preferences. For example, a viewer may prefer trucks to convertibles, Diet Coke to Pepsi, or tennis to rugby. As a result, a viewer's preferences may be used to select the advertising object.

Furthermore, the controller 137 may use revenue objectives (e.g., cost or projected revenues) of individual advertisements as another selection criterion. Because actual cost or revenues of advertisements may depend on a variety of factors, such as the underlying program, program type or the duration of the advertisement, the controller 137 may use various revenue objectives to filter out advertising objects from the vendors that are not willing to pay more than a certain price for advertisements. For example, during a game show, the controller 137 may be configured to select advertising objects that cost at most $10 per showing, so that the total cost per month for that advertiser does not exceed $4,500 a month. In another example, the advertiser may purchase a fixed plan, so that for $10,000 a month, the advertiser's content is selected as often as possible, given that other selection rules for that content are satisfied. Other revenue objectives may be possible.

Additionally, the controller 137 may select advertising objects based on other selection criteria, such as weights configured to promote a degree of variation importance. A metatag may include a weight indicating a prioritization for the advertising object. For example, a national advertising object may have a higher weight (priority) than a local the advertising object. An intermediary device inserting advertising objects may be configured to select advertising objects with higher priorities before advertising objects with lower priorities.

After applying one or more selection rules associated with the advertising descriptor, the controller 137 creates a preliminary list of advertising objects that are suitable for insertion into the data stream (635). The controller 137 then starts a conflict check (640) by identifying possible conflicts among eligible advertising objects.

The controller 137 then determines whether the advertising object conflicts with other objects appearing in the frame. Thus, for each object in the list, the controller 137 checks whether the object conflicts with other objects in this frame (645). FIG. 7A illustrates exemplary conflicts between competing advertisers. Here, the Pepsi logo 710 conflicts with the Coke bottle 720. Hence, the controller 137 may be configured to select advertising objects such that Pepsi and Coca-Cola are not proximate to one another (e.g., in the same frame, segment, or episode). The controller 137 may perform conflict analysis not only for the advertising objects of the same type (such as 20 oz. Coke and Pepsi bottles), but also for all advertising objects produced by competing advertisers. For example, rules could be configured such that Coke bottles are not presented at the same time as Frito-Lay chips, because Frito-Lay chips are produced by PepsiCo (which is a parent company of Pepsi, Frito-Lay, and Tropicana).

Alternatively or in addition, the controller 137 may perform theme analysis to determine whether the advertising object conflicts with a theme associated with the content selection. Thus, for each object in the list, the controller 137 checks whether the object conflicts with theme of the content selection (650). As shown in FIG. 7B, a beer advertisement 730 may conflict with the overall theme of a game show. As a result, a controller 137 may be configured to prevent certain advertising objects conflicting with a theme for a content selection (beer, cigarettes, prescription drugs, etc.) from being inserted in the content selection.

Referring back to FIG. 6, once a revised list of advertising objects is determined, the controller 137 may be configured to select from advertising objects with similar metrics (655). For example, in the event of a "tie" between two advertising objects, various tiebreaking criteria may be used (e.g., default to local advertising content). In one configuration, a metatag may include a weight which is descriptive of the intended audience or of advertising content that was ordered. For example, a weight of 6 may indicate that the advertising object was intended for 6 million terminals. Thus, the available weight of metatags may be allocated to ensure that the associated advertising content reaches a desired number of terminals. After placing the advertising object, a counter may be reduced to reflect that fewer placements are required. In another configuration, the weight indicates revenue realized by inserting the advertising object. For example, a weight of 3 may indicate 3×(base unit of revenue) to determine revenue that would be received by inserting the advertising object. In this manner, a cable operator may select advertising objects using precise revenue metrics. Finally, with the advertising object selected, the advertising object is inserted into the content selection (660).

Figure 8:
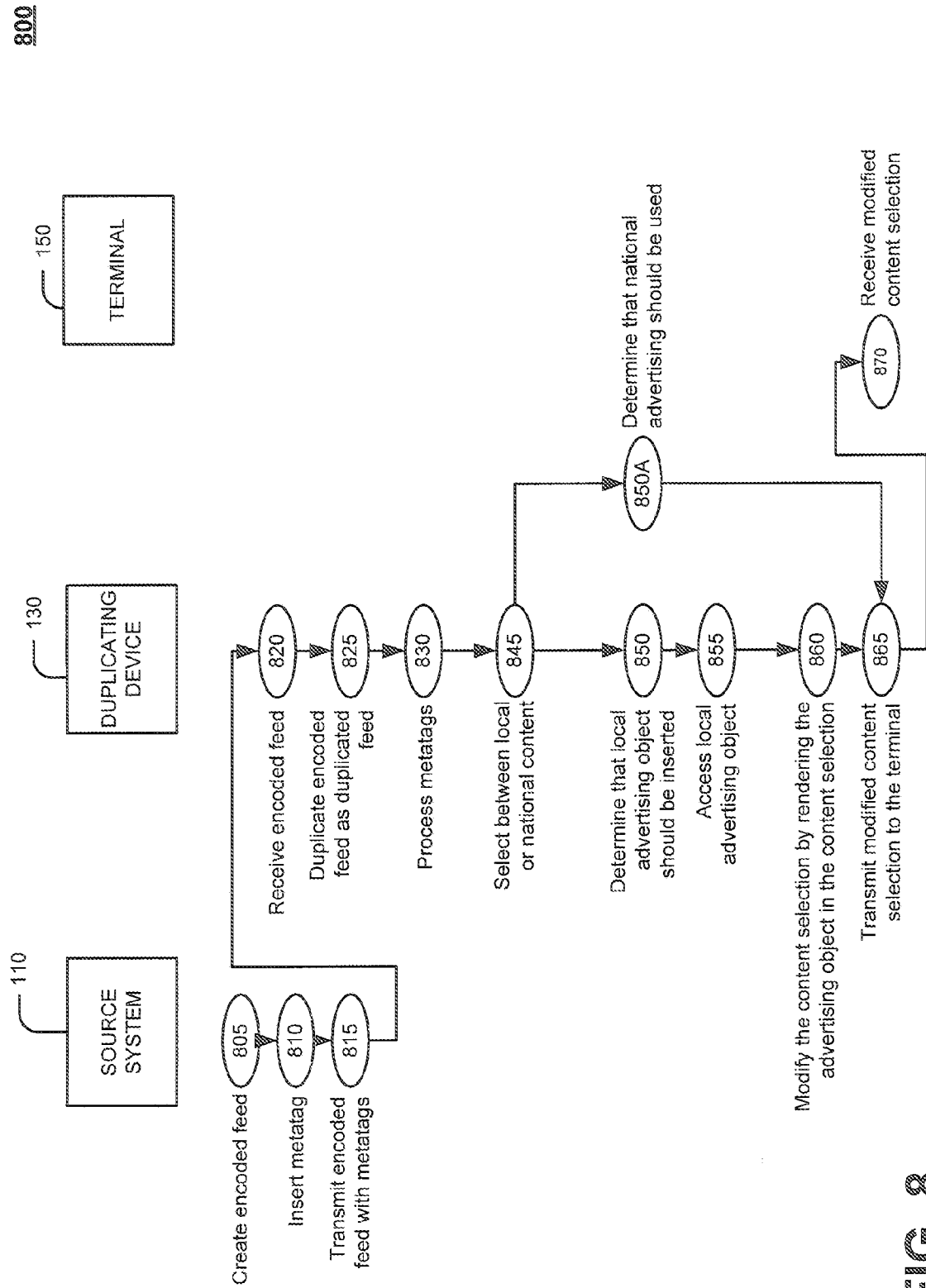
FIG. 8 is a block diagram showing data flow as a duplicating device uses metatags to enable local advertising insertion.

FIG. 8 provides a flow chart 800 that shows how metatags may be used to insert advertising objects that is different for national and local advertisers. In general, aspects of FIG. 8 relate to FIG. 2 and illustrate how advertising objects may be inserted. However, FIG. 8 illustrates how a metatag associated with an advertising object may be used to select content. Initially, the source system 110 creates an encoded feed (805), for example, by using a MPEG-4 encoder. The source system 110 then inserts metatags into the video stream (810). Typically, inserting a metatag includes creating a digital mark in an encoded stream of data units so that a duplicating device knows to insert advertisements. Metatags may be inserted using BIFS or some other technology. Typically, a metatag may include an advertising descriptor. For example, as was described with respect to FIG. 5, the metatag may include various preferences of advertisement insertion. Inserting the metatag may include inserting at least some advertising content, as was described with respect to FIG. 3. In another example, the metatag may be inserted without associated advertising content. The source system 110 transmits the encoded feed with metatags (815). If TCP is used to transmit the video stream, then the delivery and receipt of the video stream and metatags may be verified.

The source system 130 receives the encoded feed (820). The duplicating device 130 then duplicates the video stream as a stream (825).

The duplicating device 130 processes metatags (830). Generally, processing metatags involves determining a value for one or more descriptors of the metatag and/or associated content. For example, as described with respect to FIGS. 5 and 6, processing the metatag may include the information included in the metatag, such as advertising preferences. Metatags also may include information about the preferred advertising object, such as the type of object that may be inserted into the space, the size, the shape, the 3D orientation, the color of the object, or the duration over which the advertising object may be inserted.

The duplicating device 130 selects between local or national content (845), and may determine that a local advertising object should be inserted (855). If a local advertising object is selected, the local advertising object is accessed (850) and the content selection is modified by rendering the advertising object in the content selection (860). If the local advertising object is not inserted, a determination is made that national advertising should be used (850A). In any event, the duplicating device 130 transmits the content selection to the terminal (865). The terminal 150 receives the content selection (870).

Other implementations are within the scope of the following claims. For instance, a stream manager may dynamically create and remove advertising content from libraries. The stream manager may include a network operator, a managing server, a workstation, or a scheduling agent. Examples of the duplicating device include a server and a duplicating switch. While aspects of the duplicating device are described with respect to inserting advertising content, the duplicating device may be used to insert non-advertising content into a duplicated stream.

The buffer in the duplicating device may be set to a length such that, when a terminal receives the duplicated stream, the content will be outputted alongside live content through other transmissions channels. For example, the buffer length may be set to 800 ms ("milliseconds") to mimic the delay present in satellite transmissions. A 500 ms buffer enables lost data units to be retransmitted, assuming 150 ms nationwide response rates. Similarly, a 500 ms buffer enables live or emergency transmissions to e received nearly simultaneously with transmissions being sent over the airwaves as radio (e.g., Frequency modulation (FM) radio).

An intermediary device may be configured to analyze a video content selection and identify advertising opportunities within the video content selection. For example, the intermediary device may detect inter-frame stability, that is, minimal (or no) movement in objects appearing within a frame. Alternatively or in addition, inter-frame stability may be established by detecting little or no change in scenery. The intermediary device then may identify advertising opportunities within a sequence of frames by identifying objects (e.g., a table, bookshelf, desk, or counter) or by determining a lack of activities in a scene with respect to a particular region. In one implementation, the lack of scene activities may be identified by detecting a lack of flesh-coloring proximate to the particular region or by a lack of movement in the frame proximate to the particular region. The advertising opportunity may be characterized based on analysis of the frame (or sequence of frames). For example, the intermediary device may determine that a table with an orientation and dimension supports insertion of an advertisement for an object with a particular set of dimensions. The intermediary device then may generate an advertising descriptor for the advertising opportunity and retrieve an advertising object responsive to the advertising descriptor. In one implementation, the intermediary device uses metatags in addition to analyzing the sequence of frames in order to generate an advertising descriptor.

What is claimed is:

1. A method of inserting advertisements into a streaming video at an intermediary system, the method comprising:
   receiving, at the intermediary system, a data stream including a video content selection comprising:
      a first advertising segment representing content exclusively devoted to advertising;
      a first content segment featuring primary content of the video content selection that is separate and distinct from the first advertising segment; and
      a metatag embedded within the first content segment, the metatag modeling a template object appearing within first content segment so that an advertising object may be transformed using the template object, whereby the advertising object appears as if the advertising object was originally captured in the first content segment;
   processing, with at least one processor, the data stream by the intermediary system, the processing of the data stream comprising extracting the metatag from the first content segment;
   identifying, with the at least one processor, an advertising descriptor based on characteristics of a scene and the metatag extracted from the first content segment, wherein the advertising descriptor reflects a temporal transformation of the advertising object within the scene from a first appearance at a first instance to a second appearance at a second instance, and wherein the advertising object does not change its appearance between a third instance and a fourth instance even though the position of the advertising object does change between the third instance and the fourth instance,
   wherein the identifying the advertising descriptor includes referencing a selection weight rule configured to promote selection of the advertising object from a set of available advertising objects based on a numerical selection weight value associated with the advertising object, the numerical selection weight value being included in the metatag embedded within the first content segment;
   selecting the advertising object based on the identified advertising descriptor to reflect the temporal transformation of the advertising object within the scene so that the advertising object appears as if the advertising object was originally captured in the first content segment;
   receiving temporal characteristics of the advertising object;
   receiving temporal characteristics of the template object in the first content segment;
   modifying the advertising object responsive to the temporal characteristics of the template object so that the advertising object changes over time;
   modifying the video content selection by inserting the advertising object in the data stream such that the advertising object is integrated into a scene of the video content selection, where an image scene of the video content selection is modified to integrate and enable visual display of content from within the scene of the video content selection and the advertising object concurrently and so that the advertising object appears as if the advertising object was originally captured in the first content segment and so that the advertising object is displayed consistent with the temporal characteristics of the template object in the first content segment; and
   transmitting the video content selection to a recipient.

2. The method of claim 1 further comprising storing the advertising object at the intermediary system.

3. The method of claim 1 further comprising downloading the advertising object from a content server.

4. The method of claim 1 further comprising transmitting the advertising object to the intermediary system as part of the data stream.

5. The method of claim 1 wherein identifying the advertising descriptor includes referencing a selection rule, a modification rule, or an insertion rule from within the data stream.

6. The method of claim 1 wherein identifying the advertising descriptor includes referencing a selection rule and selecting, as the advertising object, an advertising object which avoids a conflict between one or more other advertising objects in the content selection.

7. The method of claim 6 wherein selecting the advertising object which avoids the conflict includes selecting the advertising object in response to determining whether a competing product has appeared, appears, or will appear in the content selection.

8. The method of claim 6 wherein selecting the advertising object which avoids the conflict includes determining whether the advertising object conflicts with a theme of the content selection, and if so, selecting a different object supporting the theme.

9. The method of claim 1 wherein identifying the advertising descriptor includes referencing a temporal rule configured to promote selection of the advertising object based on temporal characteristics associated with the advertising object that are supported by the content selection.

10. The method of claim 1 wherein identifying the advertising descriptor includes referencing a preference rule associated with the recipient and configured to promote selection of the advertising object based on recipient preferences.

11. The method of claim 1 wherein identifying the advertising descriptor includes referencing an identification code rule associated with the recipient and configured to promote selection of the advertising object based on an identification code identifying the advertising object.

12. The method of claim 1 wherein identifying the advertising descriptor includes referencing a recipient demographics rule associated with the recipient and configured to promote selection of the advertising object based on demographics of the recipient.

13. The method of claim 1 wherein identifying the advertising descriptor includes referencing a rule configured to promote selection of the advertising object using a revenue objective.

14. The method of claim 1 wherein the identifying the advertising descriptor includes referencing a rule configured to promote selection of the advertising object using content selection descriptions.

15. The method of claim 1 wherein the identifying the advertising descriptor includes referencing a rule configured to promote selection of the advertising object based on a placement location of the advertising object within the content selection.

16. The method of claim 5 wherein the modification rule specifies visual, audio, or temporal characteristics of the advertising object.

17. The method of claim 16 wherein the temporal characteristics specify a sequence of visual states for the advertising object that varies over time.

18. The method of claim 5 wherein the insertion rule indicates an opportunity to render the advertising object at a specified time for a specified duration.

19. The method of claim 1 wherein identifying the advertising descriptor includes analyzing metatags embedded within the first content segment of the data stream that describe one or more activities within the video content selection.

20. A system configured to insert advertisements into a streaming video at an intermediary system, the system comprising:
  a first communications interface structured and arranged to:
    receive a data stream including a video content selection comprising:
      a first advertising segment representing content exclusively devoted to advertising;
      a first content segment featuring primary content of the video content selection that is separate and distinct from the first advertising segment; and
      a metatag embedded within the first content segment, the metatag modeling a template object appearing within first content segment so that an advertising object may be transformed using the template object, whereby the advertising object appears as if the advertising object was originally captured in the first content segment; and
  a controller structured and arranged to:
    process the data stream by extracting the metatag from the first content segment;
    identify an advertising descriptor based on characteristics of a scene and the metatag extracted from the first content segment, wherein the advertising descriptor reflects a temporal transformation of the advertising object within the scene from a first appearance at a first instance to a second appearance at a second instance, and wherein the advertising object does not change its appearance between a third instance and a fourth instance even though the position of the advertising object does change between the third instance and the fourth instance,
      wherein the identifying the advertising descriptor includes referencing a selection weight rule configured to promote selection of the advertising object from a set of available advertising objects using a numerical selection weight value associated with the advertising object, the numerical selection weight value being included in the metatag embedded within the first content segment;
    select the advertising object based on the identified advertising descriptor to reflect the temporal transformation of the advertising object within the scene so that the advertising object appears as if the advertising object was originally captured in the first content segment;
    receive temporal characteristics of the advertising object;
    receive temporal characteristics of the template object in the first content segment;
    modify the advertising object responsive to the temporal characteristics of the template object so that the advertising object changes over time;
    modify the video content selection by inserting the advertising object in the data stream such that the advertising object is integrated into a scene of the video content selection, where an image scene of the video content selection is modified to integrate and enable visual display of content from within the scene of the video content selection and the advertising object concurrently and so that the advertising object appears as if the advertising object was originally captured in the first content segment and so that the advertising object is displayed consistent with the temporal characteristics of the template object in the first content segment; and
  a second communications interface structured and arranged to transmit the video content selection to a recipient.

21. A method of inserting advertisements into a streaming video at an intermediary system, the method comprising:
  receiving, at the intermediary system, a data stream including a video content selection comprising:
    a first advertising segment representing content exclusively devoted to advertising;
    a first content segment featuring primary content of the video content selection that is separate and distinct from the first advertising segment; and
    a metatag embedded within the first content segment, the metatag modeling a template object appearing within first content segment so that an advertising object may be transformed using the template object, whereby the advertising object appears as if the advertising object was originally captured in the first content segment;
  processing, with at least one processor, the data stream by the intermediary system, the processing of the data stream comprising extracting the metatag from the first content segment;
  identifying, with the at least one processor, an advertising descriptor based on characteristics of a scene and the metatag extracted from the first content segment,
    wherein the identifying the advertising descriptor includes referencing a selection weight rule configured to promote selection of the advertising object from a set of available advertising objects using a numerical selection weight value associated with the advertising object, the numerical selection weight value being included in the metatag embedded within the first content segment;
  selecting the advertising object based on the identified advertising descriptor;
  receiving temporal characteristics of the advertising object;

receiving temporal characteristics of the template object in the first content segment, wherein the temporal characteristics reflect a temporal transformation of the advertising object within the scene from a first appearance at a first instance to a second appearance at a second instance, whereby the advertising object appears as if the advertising object was originally captured in the first content segment, and wherein the advertising object does not change its appearance between a third instance and a fourth instance even though the position of the advertising object does change between the third instance and the fourth instance;

modifying the advertising object responsive to the temporal characteristics of the template object so that the advertising object changes over time;

modifying the video content selection by inserting the advertising object in the data stream such that the advertising object is integrated into a scene of the video content selection, where an image scene of the video content selection is modified to integrate and enable visual display of content from within the scene of the video content selection and the advertising object concurrently and so that the advertising object appears as if the advertising object was originally captured in the first content segment and so that the advertising object is displayed consistent with the temporal characteristics of the template object in the first content segment; and transmitting the video content selection to a recipient.

22. A method of inserting advertisements into a streaming video at an intermediary system, the method comprising:

receiving, at the intermediary system, a data stream including a video content selection comprising a plurality of advertising segments, and a plurality of content segments which comprise featured content;

receiving, on the intermediary system, a metatag embedded within at least one of the plurality of content segments, the metatag modeling a template object appearing within the at least one content segment so that an advertising object may be transformed using the template object, whereby the advertising object appears as if the advertising object was originally captured in the at least one content segment;

processing, with at least one processor, the data stream by the intermediary system, the processing of the data stream comprising extracting the metatag from the at least one of the plurality of content segments;

identifying, with the at least one processor, an advertising descriptor based on characteristics of a scene and the metatag extracted from the at least one of the plurality of content segments, wherein the advertising descriptor specifies that the advertising object within the scene does not change its appearance between a first instance and a second instance even though the position of the advertising object does change between the first instance and the second instance, wherein the identifying the advertising descriptor includes referencing a selection weight rule configured to promote selection of the advertising object from a set of available advertising objects using a numerical selection weight value associated with the advertising object, the numerical selection weight value being included in the metatag embedded within the at least one of the plurality of content segments;

receiving temporal characteristics associated with the advertising object;

receiving temporal characteristics associated with the template object;

modifying the advertising object responsive to the temporal characteristics associated with the template object so that the advertising object changes between a third instance and a fourth instance;

modifying the video content selection by inserting the advertising object in the data stream such that the advertising object is integrated into a scene of the video content selection, whereby the advertising object appears as if the advertising object was originally captured in the at least one content segment and so that the advertising object is displayed consistent with the temporal characteristics associated with the template object; and transmitting the video content selection to a recipient.

23. The method of claim 22 further comprising transmitting the advertising object to the intermediary system as part of the data stream.

24. The method of claim 22 wherein identifying the advertising descriptor includes referencing a selection rule and selecting, as the advertising object, an advertising object which avoids a conflict between one or more other advertising objects in the content selection.

25. The method of claim 24 wherein selecting the advertising object which avoids the conflict includes determining whether the advertising object conflicts with a theme of the content selection, and if so, selecting a different object supporting the theme.

* * * * *